United States Patent
Bengtsson et al.

(10) Patent No.: US 12,256,338 B2
(45) Date of Patent: Mar. 18, 2025

(54) MULTIPLE POWER CLASS OPERATION

(71) Applicant: Sony Group Corporation, Tokyo (JP)

(72) Inventors: Erik Bengtsson, Eslov (SE); Fredrik Rusek, Eslov (SE); Kun Zhao, Malmo (SE); Olof Zander, Sodra Sandby (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 474 days.

(21) Appl. No.: 17/634,520

(22) PCT Filed: Jul. 7, 2020

(86) PCT No.: PCT/EP2020/069096
§ 371 (c)(1),
(2) Date: Feb. 10, 2022

(87) PCT Pub. No.: WO2021/037426
PCT Pub. Date: Mar. 4, 2021

(65) Prior Publication Data
US 2022/0338133 A1     Oct. 20, 2022

(30) Foreign Application Priority Data
Aug. 23, 2019   (SE) .................................... 1950964-5

(51) Int. Cl.
*H04W 52/26*   (2009.01)
*H04W 52/28*   (2009.01)

(52) U.S. Cl.
CPC ......... *H04W 52/28* (2013.01); *H04W 52/265* (2013.01)

(58) Field of Classification Search
CPC ............................ H04W 52/28; H04W 52/265
See application file for complete search history.

(56) References Cited

U.S. PATENT DOCUMENTS 9,084,119 B2 *   7/2015   Damnjanovic ....... H04L 5/0062
9,143,946 B2 *   9/2015   Damnjanovic ....... H04W 16/10
(Continued)

FOREIGN PATENT DOCUMENTS

| CN | 102822761 A | 12/2012 |
| CN | 104247527 A | 12/2014 |

(Continued)

OTHER PUBLICATIONS

Huawei, Hisilicon, "Service Gap Control Capability Indication in UE's MM Core Network Capability" 3GPP tsg_sa\wg2_arch, tsgs2_132_xian. S2-1903777, Apr. 2, 2019.

(Continued)

*Primary Examiner* — Dominic E Rego
(74) *Attorney, Agent, or Firm* — Tucker Ellis LLP (57) ABSTRACT

A terminal (10) configured for communication with a wireless network (100), the terminal comprising: —a transceiver (313) for communicating with the wireless network; —logic (310) configured to control the transceiver to transmit (510), to the wireless network, a power class capability indication identifying communication capability of the terminal in the wireless network under at least a first power class (PC-A) and a second power class (PC-B); control the transceiver to receive (550), from the wireless network, resource configuration to execute wireless communication using an identified one, or both, of said first and second power class; and control the transceiver to operate (555) with the received resource configuration using the first and/or second power class.

18 Claims, 5 Drawing Sheets

(56) References Cited

U.S. PATENT DOCUMENTS

| | | | |
|---|---|---|---|
| 10,015,070 B1 | 7/2018 | Cai | |
| 10,368,321 B1* | 7/2019 | Sitaram | H04W 52/243 |
| 10,588,088 B1* | 3/2020 | Pawar | H04W 52/367 |
| 10,652,890 B1* | 5/2020 | Oroskar | H04W 72/0453 |
| 10,873,948 B2* | 12/2020 | Hoffmann | H04L 5/0037 |
| 10,939,369 B2* | 3/2021 | Bordeleau | H04W 76/11 |
| 11,006,455 B2* | 5/2021 | Sha | H04W 74/0833 |
| 2005/0113103 A1 | 5/2005 | Snowden | |
| 2007/0201407 A1 | 8/2007 | Borran | |
| 2009/0143065 A1* | 6/2009 | Mattila | H04L 41/12 |
| | | | 370/328 |
| 2010/0075694 A1* | 3/2010 | Damnjanovic | H04W 16/10 |
| | | | 455/452.2 |
| 2011/0081934 A1 | 4/2011 | Imamura et al. | |
| 2012/0295655 A1 | 11/2012 | Hsieh | |
| 2014/0286219 A1 | 9/2014 | Siomina | |
| 2018/0049213 A1 | 2/2018 | Gholmieh | |
| 2018/0219642 A1* | 8/2018 | Fakoorian | H04W 72/20 |
| 2019/0082326 A1* | 3/2019 | Mathison | H04W 8/18 |
| 2019/0110195 A1* | 4/2019 | Ito | H04W 12/106 |
| 2019/0174434 A1 | 6/2019 | Koskinen | |
| 2019/0387409 A1* | 12/2019 | Thangarasa | H04W 16/00 |
| 2020/0037146 A1* | 1/2020 | Salkintzis | H04W 12/06 |
| 2020/0275281 A1* | 8/2020 | Bordeleau | H04W 36/12 |
| 2021/0092690 A1 | 3/2021 | Bergstrom et al. | |
| 2023/0164113 A1* | 5/2023 | Gupta | H04L 63/0272 |
| | | | 709/245 |

FOREIGN PATENT DOCUMENTS

| | | |
|---|---|---|
| CN | 105307154 A | 2/2016 |
| CN | 107409367 A | 11/2017 |
| CN | 108029080 A | 5/2018 |
| CN | 109314550 A | 2/2019 |
| WO | 2014177184 A1 | 11/2014 |
| WO | WO-2016133632 A1 | 8/2016 |
| WO | 2018144936 A1 | 8/2018 |
| WO | WO-2019158461 A1 | 8/2019 |

OTHER PUBLICATIONS

Huawei, Hisilicon, "Draft CR for 38.101-1 power class and configure transmitted power", 3GPP tsg_ran\wg4_radio, R4-1909096, Aug. 17, 2019.

International Search Report and Written Opinion from corresponding International Application No. PCT/EP/2020/069096, mailed on Sep. 22, 2020, 10 pages.

Office Action and Search Report from corresponding Swedish Application No. 1950964-5, mailed on Feb. 24, 2020, 9 pages.

Qualcomm Incorporated, "Full Tx power for UL transmissions", 3GPP tsg_ran\wg1_rl1, Apr. 8, 2019, R1-1905028 full text, 1-21.

* cited by examiner

MULTIPLE POWER CLASS OPERATION

TECHNICAL FIELD

This disclosure relates to operation of using a terminal in a wireless communication system, in which the terminal is configured to operate under a certain power class, defining characteristics of radiated power from the terminal. Specifically, solutions are provided for configuring a terminal to operate under more than one different power classes.

BACKGROUND

For achieving higher data bandwidth, the spectrum used for communication on radio channels is expected to move to higher frequencies, e.g., to frequencies beyond 6 or 10 GHz. The 5G NR (New Radio) is a term used for denoting the wireless cellular standard which follows 4G standard (LTE, LTE-a). It follows 3GPP specifications release-15 and beyond. The mobile subscriber or station in such wireless systems is often referred to as UE (User Equipment) but will alternatively be referred to herein as a terminal.

In wireless communications, all terminals are subjected to power classification in 3GPP, and in particular to the classification in the New Radio (NR) standard. As of today, a terminal is classified according to its power characteristics, and for mmWave frequency range 2 (FR2), four different power classes (PC) exist (1-4). The PC specifies requirements when the UE is type tested and are also intended to reflect the behavior of the UE in the network.

The different terminal types envisioned for 5G NR target different applications. This has led to a PC definition that reflects the different requirements (e.g. spherical coverage, minimum max-output-power, mobility) for the different terminal types. The reasoning behind this is, e.g., that there is no need to have the same stringent mobility requirement for a fixed node terminal as needed for a handset terminal. In another example the minimum max-output-power level required for a fixed wireless terminal can be relaxed for a battery powered device. Further, in another example the same spherical coverage requirement may not be needed for all terminal types.

While this makes sense, there are conditions when PC classifications pose a limitation, for example if a terminal is used for multiple service types, e.g. acts both as a normal handset operation and as a fixed wireless modem simultaneously.

SUMMARY

Consequently, challenges still exist in the field of operation and control of terminals capable of operating in a plurality of different use scenarios.

With this objective in mind, solutions are provided herein based on the concept that a UE that belongs to one PC can, in some scenarios, perform better if it is allowed to operate in another PC, or more than one PC.

The general concept of the invention is set out in the independent claims. Various embodiments are set out in the dependent claims.

According to one example, a terminal is configured for communication with a wireless network, the terminal comprising a transceiver for communicating with the wireless network;
logic configured to
control the transceiver to transmit, to the wireless network, a power class capability indication identifying communication capability of the terminal in the wireless network under at least a first power class and a second power class;
control the transceiver to receive, from the wireless network, resource configuration to execute wireless communication using an identified one, or both, of said first and second power class; and
control the transceiver to operate with the received resource configuration using the first and/or second power class.

According to another example, a network node of a wireless network is provided, configured for communication with a terminal, comprising
a transceiver for communicating with the terminal;
an interface for communicating with a core network of the wireless network;
logic configured to
control the transceiver to receive, from the terminal, a power class capability indication identifying communication capability of the terminal in the wireless network under at least a first power class and a second power class; and
control the transceiver to transmit resource configuration to the terminal for wireless communication using an identified one, or both, of said first and second power class.

By means of the provided solution, wherein the use of PC is made flexible, benefits are obtained in terms of system performance, and terminals may conveniently be operated in a power class that appropriates suits an intended use case.

DETAILED DESCRIPTION

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof. The terms "receive" or "receiving" data or information shall to be understood as "detecting, from a received signal".

Figure 1:
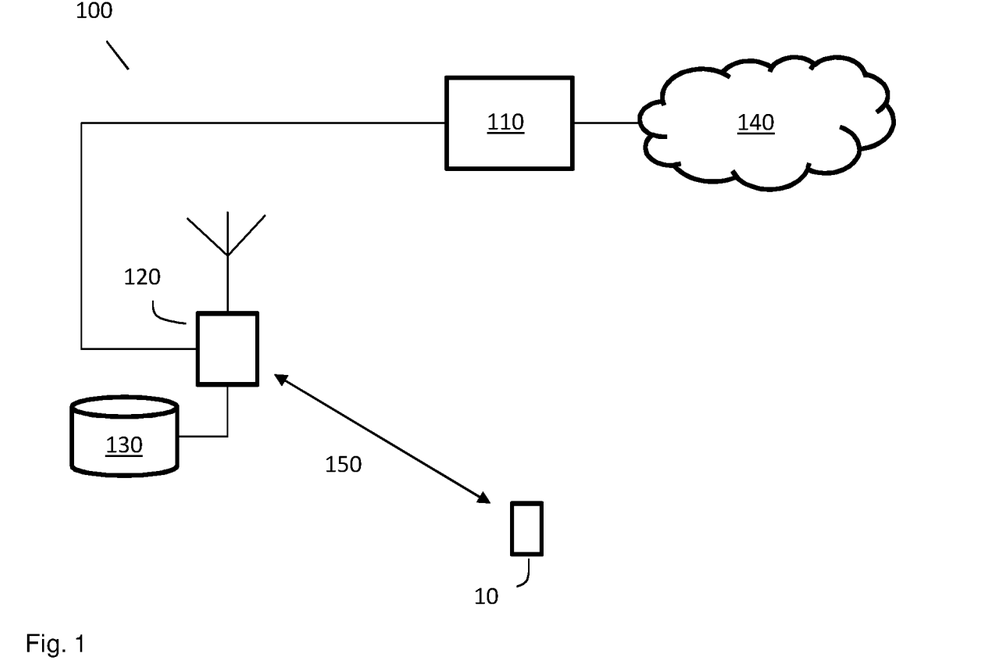
FIG. 1 schematically illustrates an implementation of a wireless communication system, in which a terminal communicates with a wireless network through an access node of the wireless network. according to various embodiments.

FIG. 1 illustrates a high-level perspective of operation of a terminal 10 in a wireless network 100. The wireless network 100 may be a radio communication network 100, configured to operate under the provisions of 5G NR as specified by Third Generation Partnership Project (3GPP), according to various embodiments outlined herein. The wireless network 100 may comprise a core network 110 and one or more base stations or access nodes, of which one access node 120 is illustrated. The access node 120 is configured for wireless communication 150 with various terminals, of which only the terminal 10 is shown. Such terminals may be selected from the group comprising: handheld device, mobile device, robotic device, smartphone, laptop, drone or vehicle, tablet computer, wearable devices etc.

Wireless communication may include data communication defined with respect to a radio access technology (RAT). While with respect to FIG. 1 and the following FIGS., various examples are provided with respect to a cellular network, in other examples, respective techniques may be readily applied to point-to-point networks. Examples of cellular networks include the 3GPP—defined networks such as 5G according to a NR access protocol.

The access node 120 may implement a radio device and may further be connected to a computation device or server 130 for performing calculations and storing data based on signals and data received and transmitted using the base station 120. In various examples, the computation device 130 may be an edge computing server, which may be configured to operate as a Mobile Edge Computing (MEC) or edge cloud host. In 3GPP specification TS 38.101-2 the assumption of UE type for a terminal is that it is associated with a dedicated PC.

Power class 1, 2, 3, and 4 are specified based on the assumption of certain UE types with specific device architectures. Presently, the UE types can be found in Table 6.2.1.0-1 of TS 38.101-2.

TABLE 6.2.1.0-1

| Assumption of UE Types | |
| --- | --- |
| UE Power class | UE type |
| 1 | Fixed wireless access(FWA) UE |
| 2 | Vehicular UE |
| 3 | Handheld UE |
| 4 | High power non-handheld UE |

However, it shall be noted that other applications or PCs may be added in the future. It is essentially different from NR FR1 or LTE system since the different PC will be related to different NR services, where the access network needs to configure the resources for different services and the core network 110 can potentially slice the network for different PCs.

The requirement, for single band terminals, in terms of minimum Effective Isotropic Radiated Power (EIRP) in peak direction and requirements on spherical coverage as defined in TS 38.101-2 and are listed below.

| -Power Class | Band | Min peak EIRP, dBm | Max EIRP dBm | Max TRP dBm | Min EIRP at CDF %-tile |
| --- | --- | --- | --- | --- | --- |
| 1 | n257, n258, n261 | 40 | 55 | 35 | 32 @ 85% |
|   | n260 | 38 |   |   | 30 @ 85% |
| 2 | n257, n258, n261 | 29 | 43 | 23 | 18 @ 60% |
|   | n260 | N/A | N/A | N/A | N/A |
| 3 | n257, n258, n261 | 22.4 | 43 | 23 | 11.5 @ 50% |
|   | n260 | 20.6 |   |   | 8 @ 50% |
| 4 | n257, n258, n261 | 34 | 43 | 23 | 25 @ 20% |
|   | n260 | 31 |   |   | 19 @ 20% |

For multi band devices there are some relaxations allowed. Similar tables for receiving sensitivity have also been defined in TS 38.101-2, which also defined the requirement in the peak and CDF %-tile of the CDF curve.

Currently, terminals can transmit its UE capabilities at two occasions:
  As a response to a UE capability enquiry message from the network 100.
  Upon a dynamic UE capability update initiated by the UE. For this case, the 3GPP standard says that UE may initiate a UE capability update while in connected mode and when the UE capabilities change compared to those stored in the variable "UE_CAPABILITY_TRANSFERRED". The UE Capability information provided by the terminal to the network may include an identification of PC. Specifically, only a single PC can be mapped to the terminal at a single point in time.

However, since for example the NR system is quite flexible and can be used to multiplex multiple service types, e.g. mobile broadband, ultra reliable low latency, IoT etc., and additional services such as radar functionality may be specified in later releases, it is suggested herein that the terminal is able to transfer information to the network whether the terminal is capable of same or different PCs for the different services that may be concurrently, i.e. simultaneously by division in frequency, code or spatially, or used almost simultaneously in a time division manner. There may also be other type of service-based differentiation possibilities in the communication protocols, e.g. to identify certain radio resources being allocated for certain types of data traffic. Methods for differentiation of services may be related to but are not limited to so-called slicing or application aware network assistance functionality. Such functionality for service differentiation may be implemented as core network resource sharing functionalities and/or on radio protocol level.

Figure 2:
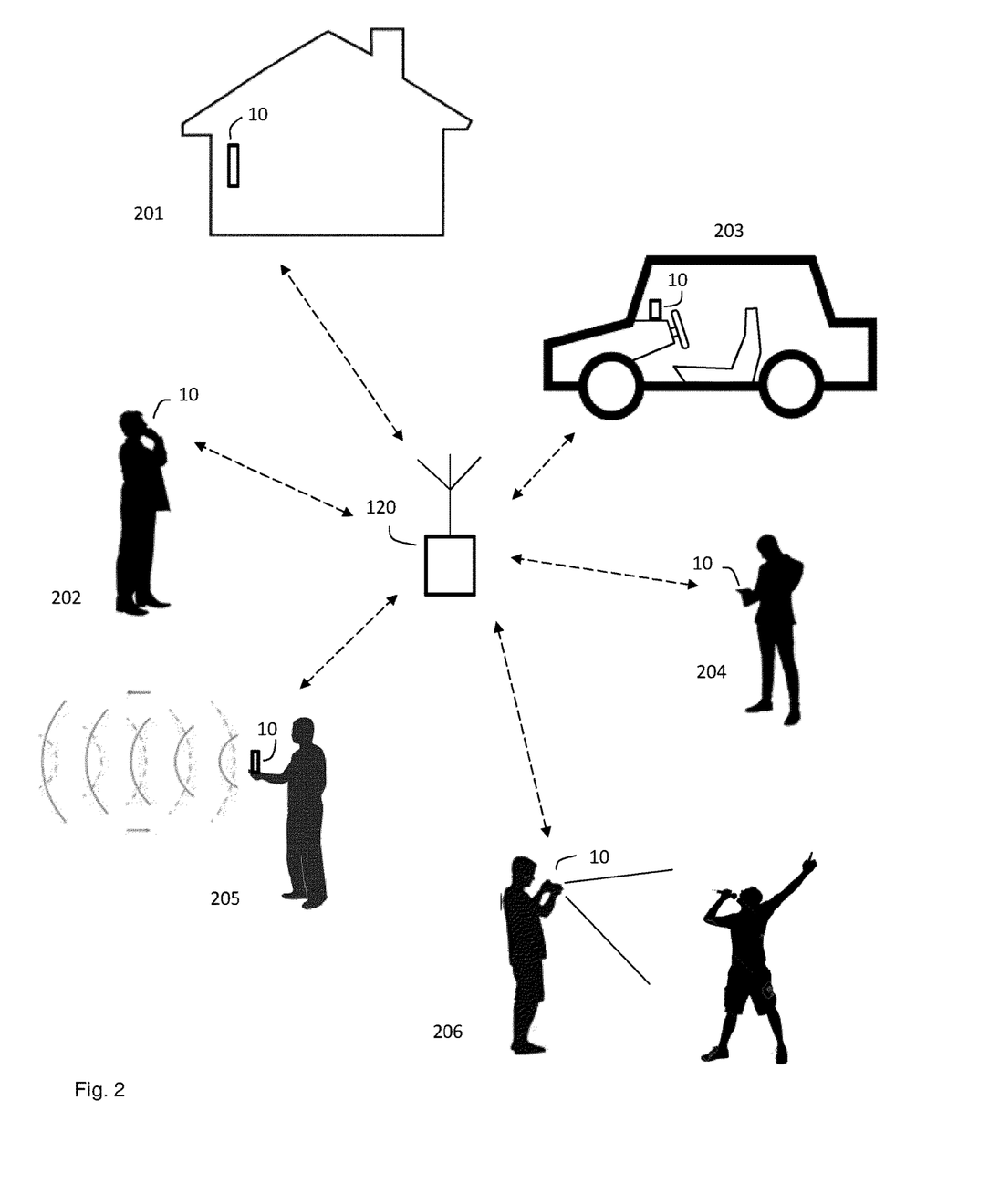
FIG. 2 schematically illustrates a plurality of different use scenarios of the terminal, in which communication with the wireless network may be carried out under different PCs according to various embodiments.

FIG. 2 schematically illustrates various exemplified use cases of a terminal 10 for different services.

Use case 201 indicates a stationary use of the terminal 10. With respect to the network, symbolized by access node 120, both distance and direction is thus stable. The terminal may be used for scares metering and UL reporting of sensor data and adapted for low battery consumption. Alternatively, or additionally, the terminal may be used as an internet 140 access point by means of its connection to the wireless network 100, by connection from further communication devices. This may require that the terminal is capable of mobile broadband communication and even low latency operation.

Use case 202 indicates voice communication.

Use case 203 indicates a vehicle implementation. The terminal 10 may be incorporated in the vehicle or be detachably connected to the vehicle. This use case indicates high mobility.

Use case 204 indicates e.g. a browsing operation using mobile broadband.

Use case 205 indicates use of the terminal 10 for radar probing. This may e.g. be accomplished using the hardware for mobile communication also for transmitting radar pulses and receiving radar echoes, a service which may be linked to a PC of its own.

Use case 206 indicates real time video capture, which may require an ultra reliable low latency service connection to the network 100.

It may be understood that the indicated use cases are exemplary, and the one and the same terminal 10 may be configured to carryout any combination of the and other service. Various different uses cases provided under the concept of network slicing are also outlined in 3GPP specification TS 28.530.

Figure 3:
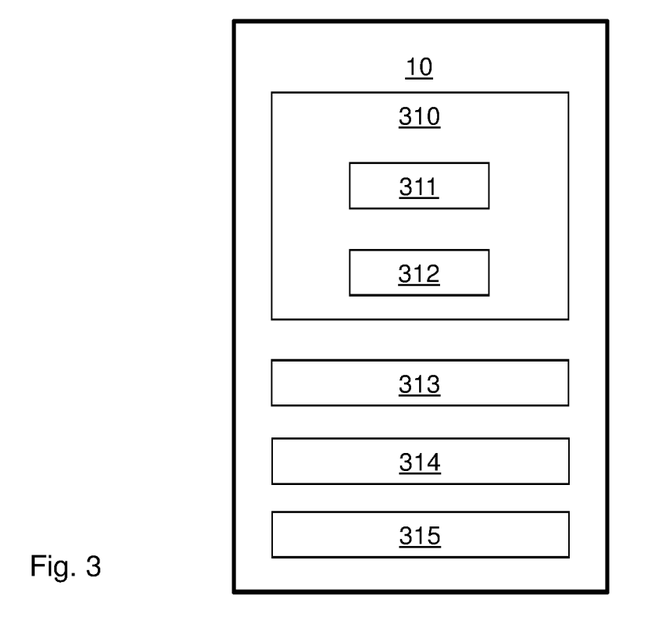
FIG. 3 schematically illustrates a terminal configured to communicate with the wireless network according to various embodiments.

FIG. 3 schematically illustrates a terminal 10 for use in a wireless network 100 as presented herein, and for carrying out the method steps as outlined. In various embodiments, the terminal 10 is a radio communication terminal for operation in a radio communication network 100.

The terminal 10 may comprise a wireless transceiver 313, such as a radio transceiver for communicating with other entities of the radio communication network 100, such as the access node, or base station, 120. The transceiver 313 may thus include a radio receiver and transmitter for communicating through at least an air interface.

The terminal 10 further comprises logic 310 configured to communicate data, via the radio transceiver, on a radio channel, to the wireless communication network 100 and/or directly with another terminal (not shown) by Device-to-Device (D2D) communication.

The logic 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the terminal 10 to carry out any of the method steps as provided herein. Software defined by said computer program code may include an application or a program that provides a function and/or a process. The software may include device firmware, an operating system (OS), or a variety of applications that may execute in the logic 310.

The terminal 10 may further comprise an antenna 314, which may include an antenna array. The logic 310 may further be configured to control the radio transceiver to employ an anisotropic sensitivity profile of the antenna array to transmit radio signals in a particular transmit direction. The terminal 10 may further comprise a positioning unit 315, configured to determine a position of the terminal 10. The positioning unit 315 may be a GPS receiver. Obviously, the terminal may include other features and elements than those shown in the drawing or described herein, such as a power supply, a casing, a user interface etc.

Figure 4:
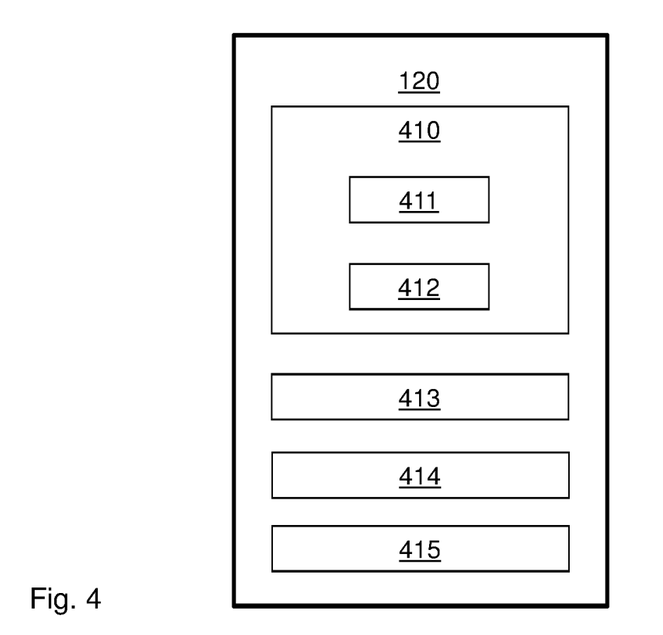
FIG. 4 schematically illustrates an access node of the wireless network according to various embodiments.

FIG. 4 schematically illustrates an access node 120 of the wireless network 100 as presented herein, and for carrying out the method steps as outlined. In various embodiments, the access node 120 is a radio base station for operation in a radio communication network 100, to serve one or more radio terminals, such as terminal 10.

The access node 120 may comprise a wireless transceiver 413, such as a radio transceiver for communicating with other entities of the radio communication network 100, such as the terminal 10. The transceiver 413 may thus include a radio receiver and transmitter for communicating through at least an air interface.

The access node 120 further comprises logic 410 configured to control the access node 120, including to communicate data, via the radio transceiver, to the terminal 10 on a radio channel.

The logic 410 may include a processing device 411, including one or multiple processors, microprocessors, data processors, co-processors, and/or some other type of component that interprets and/or executes instructions and/or data. Processing device 411 may be implemented as hardware (e.g., a microprocessor, etc.) or a combination of hardware and software (e.g., a system-on-chip (SoC), an application-specific integrated circuit (ASIC), etc.). The processing device 411 may be configured to perform one or multiple operations based on an operating system and/or various applications or programs.

The logic 410 may further include memory storage 412, which may include one or multiple memories and/or one or multiple other types of storage mediums. For example, memory storage 412 may include a random access memory (RAM), a dynamic random access memory (DRAM), a cache, a read only memory (ROM), a programmable read only memory (PROM), flash memory, and/or some other type of memory. Memory storage 412 may include a hard disk (e.g., a magnetic disk, an optical disk, a magneto-optic disk, a solid state disk, etc.).

The memory storage 412 is configured for holding computer program code, which may be executed by the processing device 411, wherein the logic 410 is configured to control the access node 120 to carry out any of the method steps as provided herein. Software defined by said computer program code may include an application or a program that provides a function and/or a process. The software may include device firmware, an operating system (OS), or a variety of applications that may execute in the logic 410.

The access node 120 may further comprise, or be connected to, an antenna 414, which may include an antenna array. The logic 410 may further be configured to control the radio transceiver to employ an anisotropic sensitivity profile of the antenna array to transmit radio signals in a particular transmit direction. The access node 120 may further comprise an interface 415, configured for communication with the core network 110. Obviously, the terminal may include other features and elements than those shown in the drawing or described herein, such as a power supply and a casing etc.

Figure 5:
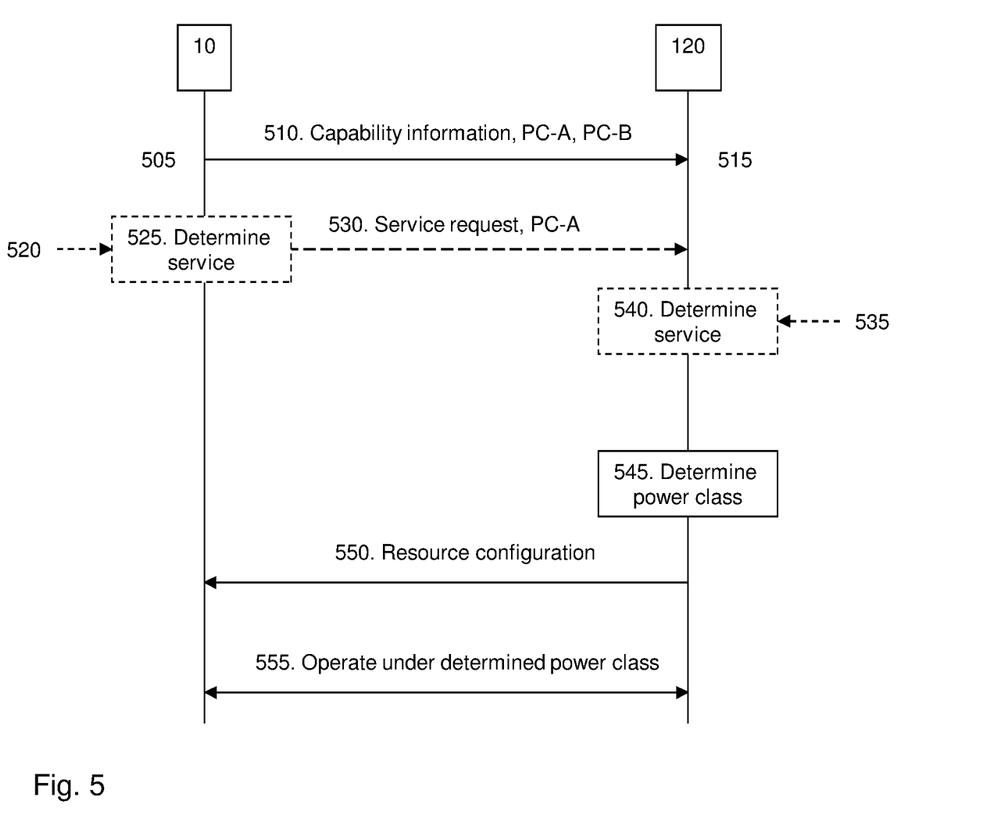
FIG. 5 schematically illustrates signaling to establish operation of a terminal under different PCs according to various embodiments.

FIG. 5 illustrates a signaling diagram, indicating acts carried out in and between a terminal 10 and an access node 120 in various embodiments, as will now be outlined. The core of the underlying idea of the solutions presented herein is to enable a terminal to signal a support of multiple PCs, which may be coupled to provision or support of different services in the wireless network 100.

According to a general aspect, the terminal 10 is configured for communication with the wireless network 100. The terminal comprises a transceiver 313 for communicating with the wireless network 100, and logic 310 configured to control inter alia the transceiver 313. Specifically, the logic is configured to control the transceiver 313 to transmit 505, to the wireless network 100, a power class capability indication 510 identifying communication capability of the terminal 10 in the wireless network 100 under at least a first power class PC-A and a second power class PC-B.

The logic 310 may further be configured to control the transceiver 313 to control the transceiver to receive, from the wireless network 100, resource configuration to execute wireless communication using an identified one, or both, of said first and second power class, and control the transceiver 313 to operate with the received resource configuration using the first and/or second power class. By this arrangement, in which the terminal reports supported PCs, the terminal 10 may be configured to transmit under two or more power classes for the same Radio Access Technology (RAT) without the network having to re-register the terminal 10 and retrieve a new set of UE capabilities.

For example, the terminal 10 may support two PCs which includes a power class PC-A for broadband (eMBB) and one power class PC-B for e.g. IoT. By means of the terminal 10 signaling its capability regarding supported power classes to the network, it may be conveniently configured to obtain the corresponding resources dependent on use case. This may save both terminal battery consumption and minimize DL signaling from the network 100.

In some embodiment, the terminal 10 may operate under at least the first power class PC-A and only partially under the second power class PC-B. As an example, the terminal 10 may support PC3 (as PC-A), and its spherical coverage (20% EIRP) may be as good as identified for PC4. However, other parameters like e.g. peak EIRP may fail to meet PC4 requirements. In such a case, the terminal 10 may signal to the wireless network 100 that it partially supports PC4. The power class capability indication 510, identifying communication capability of the terminal 10, may indicate this partial support, either explicitly to which extent the support is partial, or by conveying an indication from which the network 100 may deduce the associated support—in this example that the spherical coverage can reach PC4.

In various embodiments, the terminal may support more than two PCs, such as three, four or five different PCs, and indicate such support by means of the power class capability indication 510.

In some embodiments, the power class capability indication 510 may include an identity of the at least first power class PC-A and second power class PC-B specifically, as data conveyed as part of or associated with UE capabilities. This way, the information of supported PCs will be securely conveyed.

In some embodiments, a code or flag may be conveyed as part of or associated with UE capabilities, which code or flag is received 515 in the network 100, such as the access node 120, and decoded to a predetermined combination of supported PCs, such as PC-A and PC-B. Such code or flag may be defined by specification to identify said PCs. This way, the amount of data transmitted to convey information of supported PCs may be minimized.

In some embodiments, first power class PC-A identified by means of the power class capability indication 510 is a default PC. This way, the network 100 will configure the terminal 10 for communication using this default PC, unless a specific PC trigger occurs, such as initiation of a certain use case, service or application which is specifically linked to a certain other PC, such as PC-B.

One PC, such as PC-A, may be identified as default by being expressly identified as default in the transmitted capability information 510. Alternatively, it may be identified as default by means of order or place in the data communicated as UE capability information. In yet another alternative, the default choice of PC, among a group of two or more supported PCs, is predetermined by specification.

A certain supported PC may be required or preferable when the terminal 10 is to operate a certain service type. In this context, a service may relate to a certain use case or operation of a certain application. In various embodiments, a service type may be referred to as a standardized Slice/Service Type (SST) value. Network slicing is a concept referred to in 5G as a capability for bringing network resource utilization efficiency and deployment flexibility, and for supporting fast growing over the top (OTT) application and services. A network slice may be viewed as a logical end-to-end network that can be dynamically created. A given terminal (UE) may access to multiple slices over the same Access Network, e.g. over the same radio interface. Each slice may serve a particular service type with agreed upon Service-level Agreement (SLA). Network Slicing is defined in TS 23.501 in SA2. With reference to FIG. 1, a Network Slice is defined within a Public Land Mobile Network (PLMN) wireless network 100 and includes Core Network Control Plane and User Plane Network Functions of the core network 110 as well as the Access Network (AN) including the access node 120. Various standardized SST values are defined and standardized in TS 23.501. Such SST values are to reflect the most commonly used Slice/Service Types and will assist with global interoperability for slicing, as indicated in the table below from TS 23.501, release 16.1.0. Other SSTs are still may be contemplated.

TABLE 5.15.2.2-1

Standardised SST values

| Slice/<br>Service type | SST<br>value | Characteristics |
| --- | --- | --- |
| eMBB | 1 | Slice suitable for the handling of 5G enhanced Mobile Broadband. |
| URLLC | 2 | Slice suitable for the handling of ultra- reliable low latency communications. |
| MIoT | 3 | Slice suitable for the handling of massive IoT. |
| V2X | 4 | Slice suitable for the handling of V2X services. |

The terminal 10 may be configured to request communication with a certain supported PC when a certain service is to be executed, which PC request may be accepted under discretion of the network 100. Alternatively, the network 100 may configure the communication based on a service initiated by or through the network 100.

The proposed solution may thus be implemented by the terminal 10 announcing support of one or more PCs as part of its UE capability signaling 510. Further, in case the terminal 10 indicates multiple PCs, the terminal 10 may indicate a mapping to one or more service types for each supported PC, also in the context of capability signaling 510. Such mapping may e.g. be accomplished using UE capability indicator, a feature group indicator, a QoS level such as QCI (QoS Class Identifiers) or other. Alternatively, the terminal 10 may indicate a mapping of one or more service types for a supported PC at a later stage, such as in RRC or as higher layer signaling. For example, this may be triggered 520 by detecting initiation of a certain service, or of an application requiring or benefitting from a certain service type. This may be detected by the terminal 10 in a step 525, which may involve input triggered by a user initiating a certain functionality or application, or by connection of the terminal 10 to another device, such as a docking station, a charger, a utility accessory, a game console etc., which triggers the need or preference to operate a certain service type. In other embodiments, an application requiring or requesting service type may be input 535 through the network 100, such as through an application provider, or by the network 100 itself 540.

Further the terminal 10 may indicate, e.g. in step 510 or 530, to the network 100, whether certain PC coupled services may be combined to be used simultaneously. The PCs to be used simultaneously or at a dedicated occasion may then be implemented as a mode, triggered either by the terminal 10 or by the network 100.

The terminal 10 may thus be configured such that its logic 310 is configured to control the transceiver 313 to transmit, to the wireless network 100, an identification of support for concurrent operation of a first service under the first power class and a second service under a second power class. In some embodiments, a service type indication may be transmitted, e.g. in step 510 in association with capability signalling or in step 530 in association with configuration or initiation of a certain function or application, identifying one or more services associated with at least one of said first and second power class. In alternative embodiments, the support for concurrent operation may be identified by the wireless network based on a default rule. The network 100 may thus be conveniently announced of the capabilities of the terminal 10 and may subsequently determine PC 545 and configure resources 550 and/or operate slicing for supporting communication with the terminal 10 for operation of different services under the appropriate power class. In a subsequent step 555, the transceiver 313 of the terminal 10 is controlled to operate with the received resource configuration using the first and/or second power class. This may involve signaling or communicating with the wireless network 100 under both the first and the second power class. In various embodiments, this may include signaling or communicating with the wireless network 100 under the first power class PC-A and operating under the second power class PC-B without communication with the wireless network 100, such as for radar probing or D2D communication.

The service type indication may identify capability of concurrent operation of a first service under the first power class and a second service under a second power class. This indication may be given by the communication of the supported service type. In alternative embodiments, the indication may be specifically provided combinations of certain services, which the terminal 10 is configured to operate concurrently.

The terminal 10 may be configured to operate the transceiver 313 for the first service and the second service in time division duplex during said concurrent operation, wherein concurrent operation is quasi-simultaneous. In other embodiments, the terminal may be configured to operate the transceiver for the first service and the second service in one or more of code, frequency, and spatial division duplex during said concurrent operation, and thus potentially simultaneously in the perspective of time.

When the terminal 10 reports multiple PCs and mapped services through signaling 510, 530 to the network 100, the network 100 can optimize the network resources for the terminal 10 accordingly. For example, the network 100 can bias the resources to the service with high priority (e.g., URLLC compared to eMMB). The terminal 10 may further be configured to request different priorities for different PC or the coupled services it supports.

In some embodiments, the logic 310 of the terminal 10 may be configured to control the transceiver 313 to transmit, to the wireless network 100, a link direction capability identifying at least one of said first PC-A and second PC-B power class to only one, or both, of uplink (UL) and downlink (DL), associated with at least one service. In various embodiments, different PCs may thus be used for DL and UL, respectively, to fully make use of the advantage of each PC and NR service.

The logic 310 of the terminal 10 may specifically be configured to control the transceiver 313 to receive, from the wireless network 100, resource configuration to execute wireless communication using one PC-A in uplink and another PC-B in downlink. Such an embodiment may be employed to reduce the hardware implementation cost and complexity, as well as power consumption, in the terminal 10, where e.g. the DL and the UL do not need the same output power or spherical coverage.

In certain embodiments, the logic 310 may be configured to control the transceiver 313 communicate with the wireless network 100 in a first spatial direction using one of said first PC-A and second PC-B power classes, and in a second spatial direction, which is at least partially different from the first spatial direction, using the other of said first PC-A and second PC-B power classes. In such embodiments, receive and transmit chains of the transceiver 313 may be different. For example, a power amplifier and a beamformer of the transceiver 313 may be different for UL and DL, and the beamformer may even be dispensed with in a receive chain for DL. In various embodiments, operation in DL and UL may be fixed by terminal design or be dynamically controlled by the network 100 or the terminal 10 through signaling when the UE can operate in multiple PCs simultaneously.

Referring back to FIG. 4, the proposed solution may be implemented by the network node 120 of the wireless network 100, which node is configured for communication with the terminal 10. The network node 120 may comprise
- a transceiver 413 for communicating with the terminal;
- an interface 415 for communicating with a core network of the wireless network;
- logic 410 configured to control the transceiver 413 to receive, from the terminal 10, a power class capability indication identifying communication capability of the terminal in the wireless network under at least a first power class PC-A and a second power class PC-B, and control the transceiver to transmit resource configuration to the terminal for wireless communication using an identified one, or both, of said first and second power class.

This way, the network 100 may be configured to select and apply PCs dependent on what is appropriate for the use case or service of the terminal 10.

In some embodiments, logic 410 may be configured to control the transceiver 413 to execute communication with the terminal with said resource configuration using the first and/or second power class. In a variant of this embodiment, the terminal may be thus configured to operate under the first PC for network 100 communication, and under the second PC for another function, such as radar probing, without communication with the wireless network 100.

In one embodiment, the logic 410 may be configured to store PC capability of the first and second PCs associated with the terminal. This may be executed by local storage in the access node 120, or in another node in the wireless network 100, such as in the core network 110. In various embodiments, the terminal 10 may convey support of more than two different PCs.

In various embodiments, the logic 410 may be configured to control the transceiver 413 to receive, from the terminal 10, a service type indication identifying one or more services associated with at least one of said first and second power class.

In various embodiments, the logic 410 may be configured to control the transceiver 413 to receive, from the terminal 10, an identification of support for concurrent operation of a first service under the first power class and a second service under a second power class.

In various embodiments, the logic 410 may be configured to control the transceiver 413 to transmit, to the wireless network 100, an identification of support for concurrent operation of a first service under the first power class and a second service under a second power class.

The service type indication, or identification of support, may identify capability of concurrent operation of a first service under PC-A and a second service under PC-B.

In some embodiments, the logic 410 is configured to control the wireless network 100 to operate a first network slice for the first service, and a second network slice for the second service, which are supported by the terminal 10.

The logic 410 may be configured to concurrently support the first service under PC-A and the second service under PC-B.

The logic 410 may further be configured to operate the transceiver 413 for the first service and the second service in one or more of time, code, frequency, and spatial division duplex.

As example scenarios where there is an advantage to operate in multiple PCs simultaneously, one may consider the following embodiments, where examples of combined PC support are indicated for each scenario:
- A smartphone terminal 10, being docked into or connected to a vehicle, which terminal 10 can support URLLC service, e.g. autonomous driving, and eMMB service simultaneously, e.g. car multimedia services. This may e.g. be concurrently executed under PC 2 (possibly STT 2 or 4), and PC3 (possibly STT 1), respectively. This corresponds to use cases 203 and 204.
- A smartphone can also support radar application, where the radar application may need high directional transmitted power. In such an embodiment, the terminal 10 may need to operate on PC4 for radar probing, and PC3 for handheld communication, concurrently. This corresponds to use cases 204 and 205.
- A terminal 10 may be configured for capturing live video streaming, which is mainly for UL transmission. In this use case, spherical coverage in the DL need not be as good as for UL. So, using DL in PC3 and UL in PC4 can benefit for reducing the hardware complexity, e.g. phase shifters, antenna elements etc., especially if the terminal 10 is preconfigured for this purpose, embodied as a live coverage camera. This corresponds to the use case 206.
- In addition to the above scenarios, when multiple PCs are running simultaneously on a terminal 10, one PC can potentially become the supplementary link for other PCs to increase the robustness of the system.

In various embodiments as described, where the terminal 10 supports multiple PC operation, the logic 310 of the terminal 10 may be configured to activate or de-activate one or more PCs based on one or more of at least the following examples:
- 520: sensors, e.g. proximity sensors, accelerometer etc., in the terminal 10,
- 545: immobility detected by the wireless network 100,
- 520, 535: triggered by SW in the terminal 10 or in/connected to the network 100,
- 520: attachment of the UE to an external device, e.g. charger, docking station etc.

One embodiment where distinction is made between PC for UL and PC for DL, may be operation of radar probing, while maintaining connection to the wireless network 100. The terminal may in such an embodiment transmit at high power, preferably in a controlled narrow beam, so as to generate and detect radar echoes. Since this is transmission from the terminal 10, it may be referred to as UL transmission, even if it is not intended for reception by the wireless network 100. Concurrently, the terminal 10 may be configured to at least receive DL communication from the wireless network 100, and possibly communicate in the UL. Hence, coexistence of data communication and radar probing on a radio channel is required. Radar probing can be used for a variety of cases, include for example positioning aid, traffic detection, drone landing assistance, obstacle detection, security detection, photography features, etc. To facilitate the coexistence, one or more resource mappings may be employed to coordinate and distribute resource usage between the data communication and the radar probing. In some examples, resource elements of the resource mapping are employed for the data communication and the radar probing, respectively, which are orthogonal to each other. Here, orthogonality of resource elements may correspond to the resource elements differing from each other with respect to one or more of the following: frequency dimension; time dimension; spatial dimension; and code dimension. Sometimes, these cases are referred to frequency division duplexing (FDD), time division duplexing (TDD), spatial division duplexing; and code division duplexing (CDD). By employing orthogonal resource elements for the data communication on the one hand side and the radar probing on the other hand side, interference between the data communication and the radar probing can be mitigated. Furthermore, it becomes possible to employ one and the same hardware, e.g., a handheld device or a radio base station to perform, both, data communication and radar probing.

Figure 6:
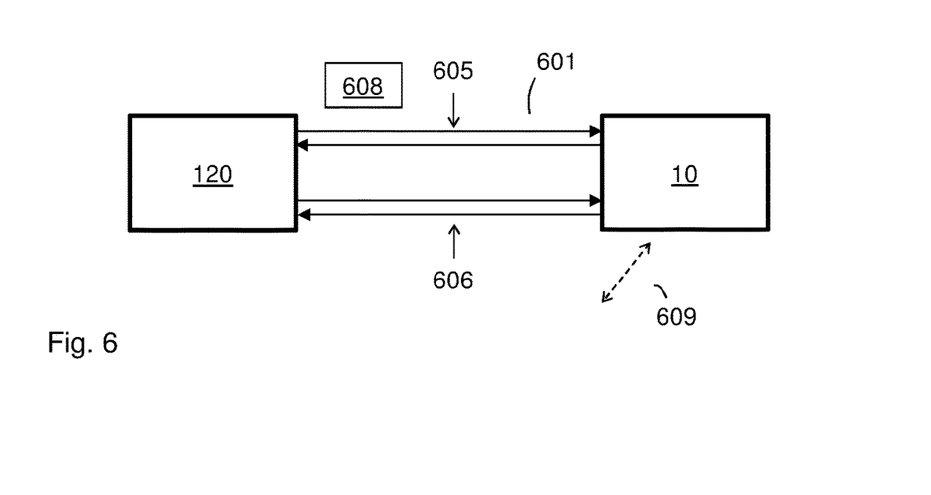
FIG. 6 schematically illustrates the example of coexistence of data communication and radar probing according to various embodiments.

In the example of FIG. 6, the data communication 608 is illustrated as bidirectional, i.e. comprising UL communication and DL communication. The data communication 608 may be defined with respect to a RAT, comprising a transmission protocol stack in layer structure. E.g., the transmission protocol stack may comprise a physical layer (Layer 1), a datalink layer (Layer 2), etc. Here, a set of rules may be defined with respect to the various layers which rules facilitate the data communication. E.g., the Layer 1 may define transmission blocks for the data communication 608 and pilot signals. The data communication 608 is supported by, both, the network node 120, as well as the terminal 10. The data communication 608 employs a shared channel 605 implemented on the radio channel 601. The shared channel 606 comprises an UL shared channel and a DL shared channel. The data communication 608 may be used in order to perform UL and/or DL communication of application-layer user data between the network node 120 and the terminal 10. As illustrated in FIG. 6, furthermore, a control channel 606 is implemented on the radio channel 601. Also, the control channel 606 is bidirectional and comprises an UL control channel and a DL control channel. The control channel 606 can be employed to implement communication of control messages.

Radar probing 609, corresponding to use case 205, can be used in order to determine the position and/or velocity of passive objects in the vicinity of the terminal 602. The radar transmitter, which is realized by configuration of the transceiver 313 of the terminal 10, is configured to transmit radar probe pulses. Likewise, the radar receiver, which is realized by configuration of radio communication terminal UE2, is configured to receive echoes of radar probe pulses reflected from passive objects. In an example, radar probe pulses are thus transmitted by the terminal 10 and corresponding echoes are received by the terminal UE2, and possibly also by further terminals, and possibly by the terminal 10.

Figure 7:
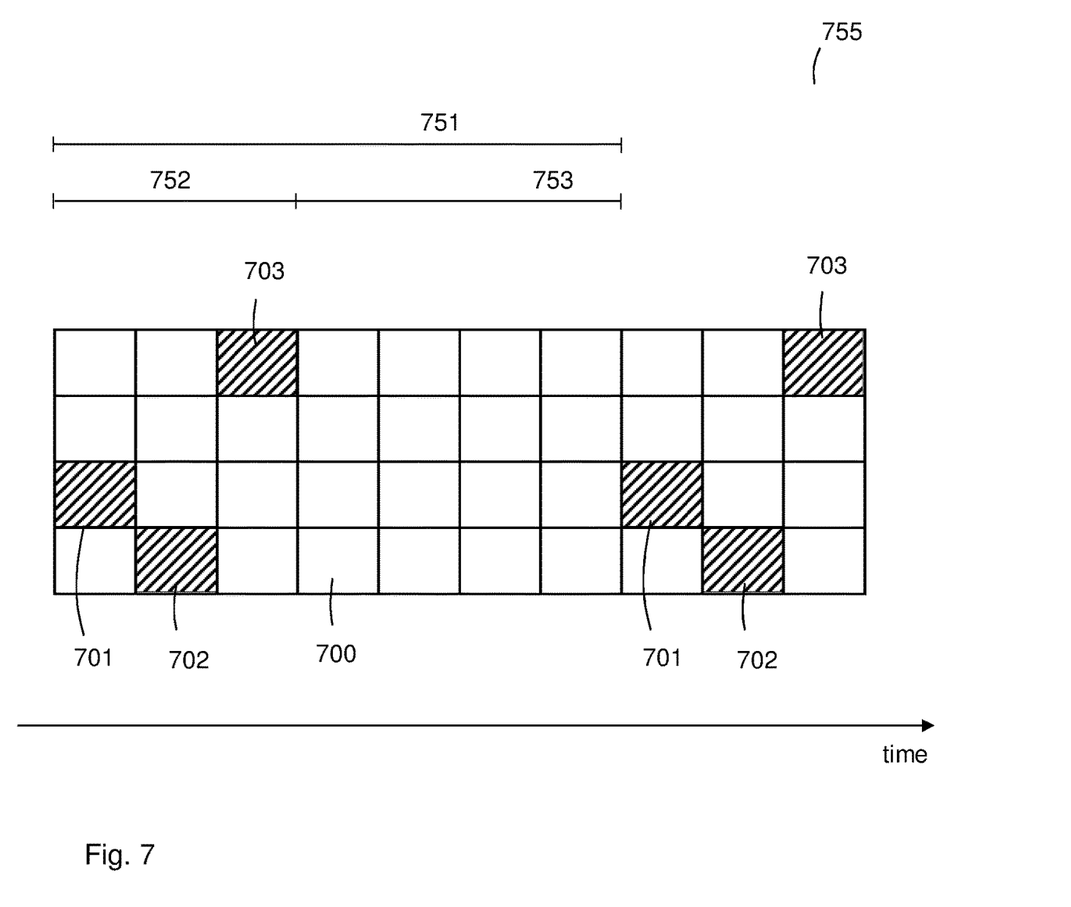
FIG. 7 schematically illustrates resource mapping of a radio channel employed for the data communication according to the embodiment of FIG. 6.

FIG. 7 illustrates aspects with respect to resource mapping 755, where transmission and reception in the terminal 10 are differently configured by the wireless network 100. As illustrated in FIG. 7, the resource mapping 755 is defined in frequency domain (vertical axis in FIG. 7) and time domain (horizontal axis in FIG. 7). The rectangular blocks in FIG. 7 illustrates different resource elements. First resource elements 700 are used for data communication, at least for DL communication, which may be executed under a first power class PC-A, such as PC3. Second resource elements 701-703 are used for radar probing 109, which may be executed under a second power class PC-B, such as PC4. As illustrated in FIG. 7, FDD and TDD techniques are employed to ensure that the first resource elements 700 and the second resource elements 701-703 are orthogonal with respect to each other. Illustrated in FIG. 7 is an example where the second resource elements 701-703 are arranged in an intermittent sequence. A repetition period 751 of the sequence of second resource elements 701-703 comprises a time duration 752 during which the second resource elements 701-703 are allocated in order to facilitate the radar probing 109; and further comprises a time duration 753 during which the second resource elements 701-703 are not present or muted.

Various embodiments of the proposed solutions may include any combination of the following clauses C:

C1. A terminal configured for communication with a wireless network, the terminal comprising
a transceiver for communicating with the wireless network;
logic configured to
control the transceiver to transmit, to the wireless network, a power class capability indication identifying communication capability of the terminal in the wireless network under at least a first power class and a second power class;
control the transceiver to receive, from the wireless network, resource configuration to execute wireless communication using an identified one, or both, of said first and second power class; and
control the transceiver to operate with the received resource configuration using the first and/or second power class.

C2. The terminal of C1, wherein the first power class is a default power class.

C3. The terminal of C1 or C2, wherein said capability indication includes an identity of both the first power class and the second power class.

C4. The terminal of any previous clause, wherein the logic is configured to
control the transceiver to transmit, to the wireless network, a service type indication identifying one or more services associated with at least one of said first and second power class.

C5. The terminal of any previous clause, wherein the logic is configured to
control the transceiver to transmit, to the wireless network, an identification of support for concurrent operation of a first service under the first power class and a second service under a second power class.

C6. The terminal of C4 or C5, wherein the logic is configured to operate the transceiver for the first service and the second service in one or more of time, code, frequency, and spatial division duplex during said concurrent operation.

C7. The terminal of any preceding clause, wherein the logic is configured to
detect initiation of a predetermined service associated with one of said first and second power class;
operate said predetermined service under the associated power class.

C8. The terminal of any preceding clause, wherein the power class capability indication identifies partial communication capability of the terminal in the wireless network under the second power class.

C9. The terminal of any preceding clause, wherein the logic is configured to control the transceiver to transmit, to the wireless network, a link direction indication identifying at least one of said first and second power class to only one, or both, of uplink and downlink, associated with at least one service.

C10. The terminal of C9, wherein the logic is configured to control the transceiver to communicate with the wireless network in a first spatial direction using one of said first and second power class, and in a second spatial direction, which is at least partially different from the first spatial direction, using the other of said first and second power class.

C11. The terminal of any preceding clause, wherein the logic is configured to control the transceiver to receive, from the wireless network, resource configuration to execute wireless communication using one power class in uplink and another power class in downlink.

C12. A method for operating a terminal in communication with a wireless network, comprising transmitting, to the wireless network, a power class capability indication identifying communication capability of the terminal in the wireless network under at least a first power class and a second power class;

receiving, from the wireless network, resource configuration to execute wireless communication using an identified one, or both, of said first and second power class; and operating with the received resource configuration using the first and/or second power class.

C13. The method of C12, further characterized in accordance with any of the preceding clauses.

C14. A network node of a wireless network configured for communication with a terminal, comprising
a transceiver for communicating with the terminal;
an interface for communicating with a core network of the wireless network;
logic configured to
control the transceiver to receive, from the terminal, a power class capability indication identifying communication capability of the terminal in the wireless network under at least a first power class and a second power class;
control the transceiver to transmit resource configuration to the terminal for wireless communication using an identified one, or both, of said first and second power class.

C15. The network node of clause 14, wherein the logic is configured to control the transceiver to execute communication with the terminal with said resource configuration using the first and/or second power class.

C16. The network node of C14 or C15, wherein the logic is configured to store power class capability of said first and second power classes associated with the terminal.

C17. The network node of any of clauses C14-C16, wherein the logic is configured to control the transceiver to receive, from the terminal, a service type indication identifying one or more services associated with at least one of said first and second power class.

C18. The network node of any of clauses C14-C16, wherein the logic is configured to control the transceiver to receive, from the terminal, an identification of support for concurrent operation of a first service under the first power class and a second service under a second power class.

C19. The network node of C17 or C18, wherein the logic is configured to control the wireless network to operate a first network slice for the first service, and a second network slice for the second service.

C20. The network node of any of clauses C17-C19, wherein the logic is configured to concurrently support the first service under the first power class, and the second service under the second power class.

C21. The network node of any of clauses C17-C20, wherein the logic is configured to operate the transceiver for the first service and the second service in one or more of time, code, frequency, and spatial division duplex.

By effect of the presently disclosed solutions, the terminal 10 can operate with different power classes depending on which protocol mode/service is used in NR, and if the flexible NR system uses several concurrent or simultaneous services for one and the same terminal, the wireless network 100 is provided with sufficient basis for handling this in terms of terminal output power.

Although the invention has been shown and described with respect to certain preferred examples, equivalents and modifications will occur to others skilled in the art upon the reading and understanding of the specification. The present invention includes all such equivalents and modifications and is limited only by the scope of the appended claims.

The invention claimed is:

1. A terminal configured for communication with a wireless network, the terminal comprising
a transceiver for communicating with the wireless network;
logic configured to
control the transceiver to transmit, to the wireless network, a power class capability indication identifying communication capability of the terminal in the wireless network under at least a first power class and a second power class;
control the transceiver to transmit, to the wireless network, an identification of support for concurrent operation of a first service under the first power class and a second service under the second power class;
control the transceiver to receive, from the wireless network, resource configuration to execute wireless communication using an identified one, or both, of said first and second power class; and
control the transceiver to operate with the received resource configuration using the first and/or second power class.

2. The terminal of claim 1, wherein the first power class is a default power class.

3. The terminal of claim 1, wherein said capability indication includes an identity of both the first power class and the second power class.

4. The terminal of claim 1, wherein the logic is configured to
control the transceiver to transmit, to the wireless network, a service type indication identifying one or more services associated with at least one of said first and second power class.

5. The terminal of claim 4, wherein the logic is configured to operate the transceiver for the first service and the second service in one or more of time, code, frequency, and spatial division duplex during said concurrent operation.

6. The terminal of claim 1, wherein the logic is configured to
    detect initiation of a predetermined service associated with one of said first and second power class;
    operate said predetermined service under the associated power class.

7. The terminal of claim 1, wherein the power class capability indication identifies partial communication capability of the terminal in the wireless network under the second power class such that the terminal meets the requirements for at least one parameter of the second power class, but does not meet the requirements for at least one other parameter of the second power class.

8. The terminal of claim 1, wherein the logic is configured to
    control the transceiver to transmit, to the wireless network, a link direction indication identifying at least one of said first and second power class to only one, or both, of uplink and downlink, associated with at least one service.

9. The terminal of claim 8, wherein the logic is configured to
    control the transceiver to communicate with the wireless network in a first spatial direction using one of said first and second power class, and in a second spatial direction, which is at least partially different from the first spatial direction, using the other of said first and second power class.

10. The terminal of claim 1, wherein the logic is configured to
    control the transceiver to receive, from the wireless network, resource configuration to execute wireless communication using one power class in uplink and another power class in downlink.

11. A method for operating a terminal in communication with a wireless network, comprising
    transmitting, to the wireless network, a power class capability indication identifying communication capability of the terminal in the wireless network under at least a first power class and a second power class;
    control the transceiver to transmit, to the wireless network, an identification of support for concurrent operation of a first service under the first power class and a second service under the second power class;
    receiving, from the wireless network, resource configuration to execute wireless communication using an identified one, or both, of said first and second power class; and
    operating with the received resource configuration using the first and/or second power class.

12. A network node of a wireless network configured for communication with a terminal, comprising
    a transceiver for communicating with the terminal;
    an interface for communicating with a core network of the wireless network;
    logic configured to
    control the transceiver to receive, from the terminal, a power class capability indication identifying communication capability of the terminal in the wireless network under at least a first power class and a second power class;
    control the transceiver to receive, from the terminal, an identification of support for concurrent operation of a first service under the first power class and a second service under a second power class;
    control the transceiver to transmit resource configuration to the terminal for wireless communication using an identified one, or both, of said first and second power class.

13. The network node of claim 12, wherein the logic is configured to
    control the transceiver to execute communication with the terminal with said resource configuration using the first and/or second power class.

14. The network node of claim 12, wherein the logic is configured to
    store power class capability of said first and second power classes associated with the terminal.

15. The network node of claim 12, wherein the logic is configured to
    control the transceiver to receive, from the terminal, a service type indication identifying one or more services associated with at least one of said first and second power class.

16. The network node of claim 15, wherein the logic is configured to
    control the wireless network to operate a first network slice for the first service, and a second network slice for the second service.

17. The network node of claim 15, wherein the logic is configured to concurrently support the first service under the first power class, and the second service under the second power class.

18. The network node of claim 15, wherein the logic is configured to operate the transceiver for the first service and the second service in one or more of time, code, frequency, and spatial division duplex.

* * * * *